United States Patent
Chaudhuri et al.

(10) Patent No.: US 7,155,459 B2
(45) Date of Patent: Dec. 26, 2006

(54) TIME-BOUND DATABASE TUNING

(75) Inventors: Surajit Chaudhuri, Redmond, WA (US); Sanjay Agrawal, Kirkland, WA (US); Vivek Narasayya, Redmond, WA (US)

(73) Assignee: Miccrosoft Corporation, Redmond, WA (US)

( * ) Notice: Subject to any disclaimer, the term of this patent is extended or adjusted under 35 U.S.C. 154(b) by 445 days.

(21) Appl. No.: 10/185,999

(22) Filed: Jun. 28, 2002

(65) Prior Publication Data
US 2004/0003004 A1    Jan. 1, 2004

(51) Int. Cl.
G06F 12/12    (2006.01)
(52) U.S. Cl. .................................................. 707/200
(58) Field of Classification Search ............. 707/200, 707/5, 1, 3, 2; 714/2
See application file for complete search history.

(56) References Cited

U.S. PATENT DOCUMENTS

| | | | | |
|---|---|---|---|---|
| 5,214,778 | A * | 5/1993 | Glider et al. | 714/2 |
| 5,335,345 | A * | 8/1994 | Frieder et al. | 707/5 |
| 5,404,510 | A * | 4/1995 | Smith et al. | 707/2 |
| 5,913,206 | A * | 6/1999 | Chaudhuri et al. | 707/2 |
| 5,913,207 | A * | 6/1999 | Chaudhuri et al. | 707/2 |
| 5,926,813 | A * | 7/1999 | Chaudhuri et al. | 707/5 |
| 5,950,186 | A * | 9/1999 | Chaudhuri et al. | 707/2 |
| 5,960,423 | A * | 9/1999 | Chaudhuri et al. | 707/2 |
| 6,023,695 | A * | 2/2000 | Osborn et al. | 707/3 |
| 6,029,163 | A * | 2/2000 | Ziauddin | 707/2 |
| 6,105,019 | A * | 8/2000 | Burrows | 707/2 |
| 6,266,658 | B1 * | 7/2001 | Adya et al. | 707/2 |
| 2002/0046204 | A1 * | 4/2002 | Hayes | 707/1 |

OTHER PUBLICATIONS

Oracle Corporation, Oracle Enterprise Manager Oracle Expert User's Guide, Jun. 1997.*

Yannis Kotidis et al. "DynaMat: A Dynamic View Management System for Data Wharehouses" ACM, 1999, pp. 371-382.*

"Automated Selection of Materialized Views and Indexes for SQL Databases", Sanjay Agrawal, Surajit Chaudhuri and Vivek Narasayya, Proceedings of the 26th International Conference on Very Large Databases, Cairo, Egypt, 2000, pp. 496-505.

"AutoAdmin "What-If" Index Analysis Utility", Surajit Chaudhuri and Vivek Narasayya, Proceedings of ACM SIGMOD, 1998.

"An Efficient, Cost-Driven Index Selection Tool for Microsoft SQL Server", Surajit Chaudhuri and Vivek Narasayya, Proceedings of the 23rd VLDB Conference, Athens, Greece, 1997, pp. 146-155.

(Continued)

Primary Examiner—Paul Rodriguez
Assistant Examiner—Luke Osborne
(74) Attorney, Agent, or Firm—Microsoft Corporation

(57) ABSTRACT

A method is provided for tuning a database to recommend a set of physical design structures for the database that optimize database performance for a given workload given a total time bound that defines a maximum amount of time that can be spent tuning the database. A cumulative set of recommended structures is maintained and incrementally updated based on tuning that is performed in intervals over portions of the workload. The cumulative set of recommended structures is updated by tuning the database by examining a predetermined portion of the workload during a time slice that is a fraction of the total time bound. At the end of the time slice, a set of recommended structures has been enumerated that is based on the workload portions that have been examined thus far. The set of recommended structures is updated until all queries in the workload have been examined or until the time bound is reached.

42 Claims, 4 Drawing Sheets

OTHER PUBLICATIONS

"Index Merging", Surajit Chaudhuri and Vivek Narasayya, Proceedings of the IEEE Conference on Data Engineering (ICDE), 1999.

"Index Tuning Wizard for Microsoft SQL Server 2000", Sanjay Agrawal, Surajit Chauduri, Lubor Kollar, Vivek Narasayya, Microsoft White Paper. http://research.microsoft.com/db/AutoAdmin/.2000.

"DB2 Advisor: An Optimizer Smart Enough to Recommend Its Own Indexes", Gary Valentin, Michael Zuliani, Daniel C. Zilio, Guy Lohman and Alan Skelley, IEEE, pp. 101-110, copyright 2000.

U.S. Appl. No. 10/914,901, Surajit Chaudhuri.

A. Shukla, P. Deshpande, J. Naughton, "Materialized View Selection for Multi-Cube Data Models". In Proceedings of EDBT 2000, 16 pages.

Documentation: "Oracle Enterprise Manager—Database Tuning with the Oracle Tuning Pack," Release 9.0.1, Jun. 2001, including "Part V Getting Started with Oracle Index Tuning Wizard.", 275 pages.

D.C.Zilio, et al. "Recommending Materialized Views and Indexes with the IBM DB2 Design Advisor", Proceedings of International Conference on Autonomic Computing (ICAC'04), 2004.

D.C.Zilio, et al, "DB2 Design Advisor: Integrated Automatic Physical Database Design", Proceedingd of the 30th VLDB Conference, Toronto, Canada, 2004, pp. 1087-1097.

P. Griffiths Selinger,et al "Access Path Selection in a Relational Database Management System", Published in 1979 by AMS, Inc; digital recreation by E.A. Brewer, 2002, p. 23-34.

D. Lomet, et al "Bulletin on The Technical Committee on Data Engineering", Sep. 1995, vol. 18, No. 3, IEEE Computer Society, p. 1-47.

Benoit Dageville, et al "Automatic SQL Tuning in Oracle 10g", Proceedeings of the 30th VLDB Conference, Toronto, Canada, 2004, pp. 1098-1109.

Surajit Chaudhuri, et al "On Random Sampling over Joins.".

Sanjay Agrawal, et al "Database Tuning Advisor for Microsoft SQL Server 2005", Proceeding of the 30th VLDB Conference, Toronto, Canada 2004.

Nicolas Bruno, et al "Automatic Physical Database Tuning: A Relaxation-based Approach", SIGMOD 2005, Jun. 13-16, 2005, Baltimore, USA.

* cited by examiner

TIME-BOUND DATABASE TUNING

TECHNICAL FIELD

The present invention relates generally to the field of database systems. More particularly, the present invention relates to the field of query optimization for database systems.

BACKGROUND OF THE INVENTION

Computer database systems manage the storage and retrieval of data in a database. A database comprises a set of tables of data along with information about relations between the tables. Tables represent relations over the data. Each table comprises a set of records of data stored in one or more data fields. The records of a table are also referred to as rows, and the data fields of records in a table are also referred to as columns.

A database server processes data manipulation statements or queries, for example, to retrieve, insert, delete, and update data in a database. Queries are defined by a query language supported by the database system. Due to the importance of the physical design several commercial database systems include tools for automating the choice of physical design structures such as indexes and materialized views to be included as part of the physical design of the database. These tools include the Tuning Wizard in Microsoft SQL Server 7.0 and 2000. One important aspect of these tools is that they take as input a workload consisting of SQL queries and updates and tune the physical design such that the performance of the workload is optimized. Such workloads can be obtained by using event logging capabilities in the database system, e.g. SQL Server Profiler in Microsoft SQL Server 2000. Often, the workloads provided as input to the tool can be large since the workload contains queries that execute over a relatively large window of time (e.g., a day or week). Faced with a large workload (i.e., large number of queries and updates), the running time of these tools can be become significant. In Tuning Wizard for Microsoft SQL Server 2000, there are three modes in which tuning can be performed: Fast, Medium, and Thorough. Each of these modes performs progressively more detailed analysis requiring more time, but produces better quality recommendations. However, physical design tuning is often done during a batch window, e.g., overnight, when the database server is not loaded or is offline. Note that none of the tuning modes can guarantee that tuning is completed within a specified period of time, and if the tuning process must be terminated prior to its completion, a significant amount of the work done by the tuning thus far may be lost.

In the realm of automatic database tuning, the task of index selection, i.e. automatically selecting an appropriate set of indexes for a given database and workload is challenging for several reasons. First, because database schema of real applications can be large and indexes can be defined on a sequence of one or more columns, the space of indexes that are relevant for the workload (i.e., can possibly be used to answer queries in the workload) can be very large. Second, today's query optimizers can exploit available indexes in sophisticated ways such as intersection of two or more indexes, use of covering indexes, etc. . . Thus it becomes important to take into account interactions among indexes. For example, the presence of a clustered index on each of the join attributes can result in a very efficient plan for the join (using the clustered index on each of the join attributes can result in a very efficient plan for the join (using the Merge Join operator)), whereas the presence of only one index but not the other may result in a plan with significantly higher cost. Third, the choice of indexes must be done while honoring certain constraints, e.g. limiting the amount of storage space allotted to indexes, and ensuring that at most one clustered index per table can be chosen. Thus index selection can be viewed as an optimization problem where the goal is to find the most beneficial subset of the relevant indexes for the workload that obeys the given constraints.

Recently, several major database vendors have begun shipping index selection tools to address the issue of interactions among indexes. Microsoft's SQL Server product uses a hill climbing algorithm, referred to as Greedy(m,k), as the search strategy. Greedy(m,k) starts by enumerating all sets of size m from the candidate set. It chooses the optimal set of size m and then greedily (based on the additional benefit accrued given the current configuration) adds the indexes until the size of the set reaches k. The value of k is determined by storage constraints. One drawback to the Greedy(m,k) approach is that it cannot provide a guarantee about the quality of the solution produced. This approach also lacks formal analysis and can end up doing significant work since it enumerates overall sets of size m. Moreover, even in the greedy phase, it evaluates every candidate index against the entire workload to find its incremental benefit.

For automatic index selection, IBM's DB2 product implements a Knapsack based algorithm underlying the index selection tool. This approach converts the Index Selection problem to a 0–1 Knapsack problem and then uses the greedy algorithm. The crucial step in the Knapsack approach is the assignment of benefits to indexes. In the DB2 approach, the benefit on an index belong to the best set of indexes for a query, is defined as the entire benefit of the winning set of indexes for that query. Also, the initial solution obtained from the greedy Knapsack is refined by calling a routine called "TRY_VARIATION" that creates a variant of the solution by randomly swapping a small set of indexes in the solution for a small set of indexes not in the solution. Like Greedy(m,k) IBM's Knapsack is unable to provide any guarantees about the quality of the solution produced. In addition, indexes that do not make a big difference to a query may be assigned a high benefit just because they are part of the winning configuration for that query meaning that this approach may overestimate the benefits of unimportant indexes.

SUMMARY OF THE INVENTION

By providing an incremental tuning process that determines a cumulative recommended physical design configuration based on all examined portions of the workload at the end of each of a series of tuning intervals, database tuning can be performed within a specified period of time to achieve better overall performance. Incremental tuning is enabled by constructing incrementally maintained data structures that guide or prioritize the next increment of tuning based on the sum of all tuning that has been completed.

A database is tuned to recommend a set of physical design structures for the database that optimize database performance for a given workload. A total time bound is given that defines a maximum amount of time that can be spent tuning. A set of recommended structures is maintained and updated incrementally during tuning of the database performed by examining a predetermined portion of the workload during a time slice that is a fraction of the total time bound. The set of recommended structures is cumulative with respect to the tuning process such that at the end of the time slice, a set of recommended structures has been enumerated that is based on the workload portions that have been examined thus far. The updating step is repeated until all queries in the workload have been examined or until the time bound is reached.

In the described embodiment, the time slice has a duration approximately equal to the square root of the total time bound given for tuning. The updating step is performed by parsing queries in the workload for a first portion of the time slice; selecting candidate structures that are relevant to queries that have been parsed for a second portion of the time slice; and enumerating the set of structures during a third time portion of the time slice.

To facilitate incremental tuning, the parsing step is performed by ranking queries in order of cost in a priority queue. The selecting step is performed by examining the queries in the priority queue in order of rank and discarding any candidate structures that are not in a lattice of frequently accessed objects. The enumerating step is performed by determining the benefit of candidate structures in order of their applicability and maintaining a cumulative benefit for each candidate structure based on the tuning performed in each time slice. Structures having the highest cumulative benefit are selected for enumeration.

Further advantages and a fuller understanding of the invention will be had from the accompanying drawings and the detailed description of the invention.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF PREFERRED EMBODIMENT

Exemplary Operating Environment

Figure 1:
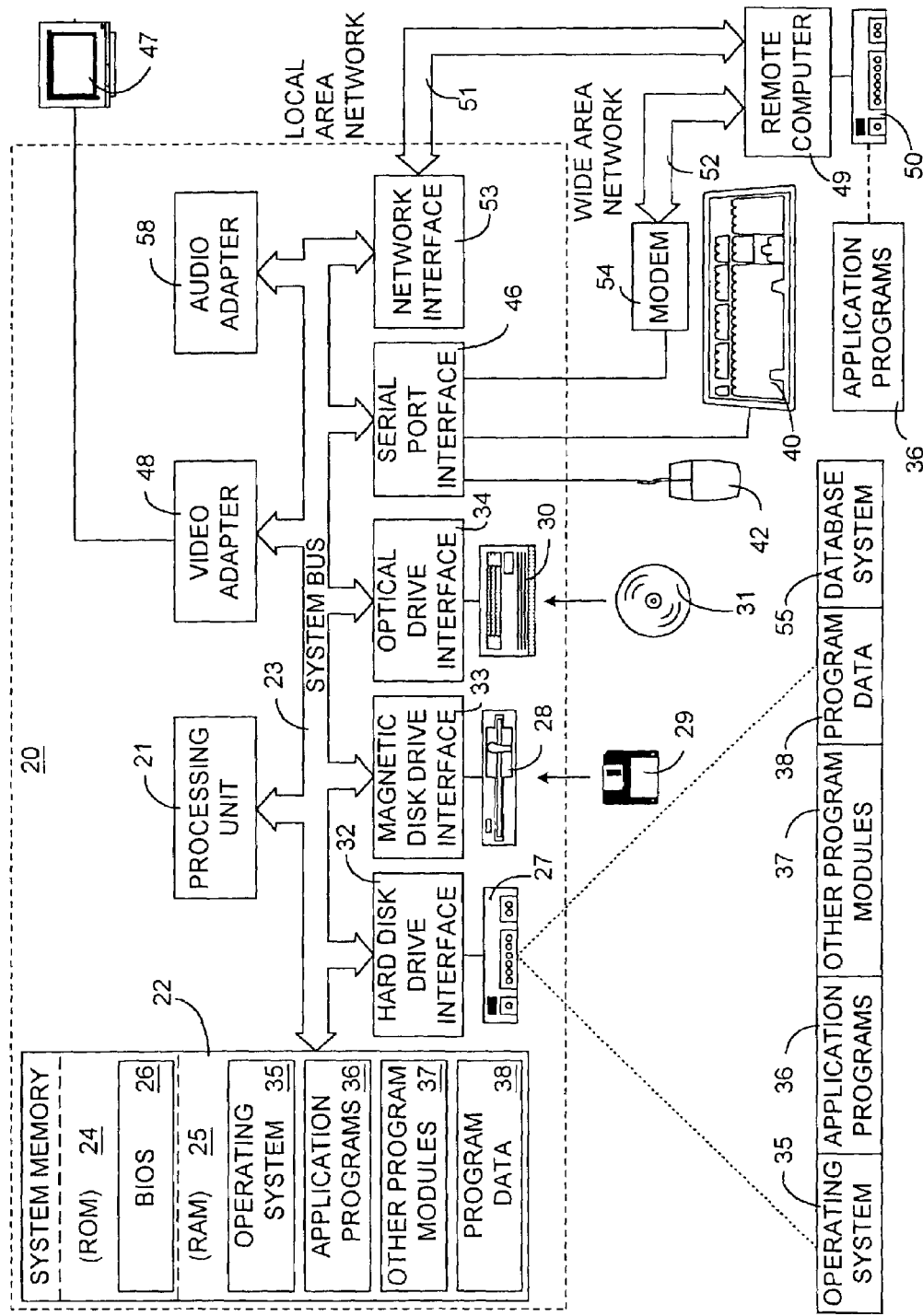
FIG. 1 illustrates an exemplary operating environment for tuning a database within a given time bound.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 24 that couples various system components including system memory 22 to processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system (BIOS) 26, containing the basic routines that help to transfer information between elements within personal computer 20, such as during start-up, is stored in ROM 24. Personal computer 20 further includes a hard disk drive 27 for reading from and writing to a hard disk, a magnetic disk drive 28 for reading from or writing to a removable magnetic disk 29 and an optical disk drive 30 for reading from or writing to a removable optical disk 31 such as a CD ROM or other optical media. Hard disk drive 27, magnetic disk drive 28, and optical disk drive 30 are connected to system bus 23 by a hard disk drive interface 32, a magnetic disk drive interface 33, and an optical drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, it should be appreciated by those skilled in the art that other types of computer-readable media which can store data that is accessible by computer, such as random access memories (RAMs), read only memories (ROMs), and the like may also be used in the exemplary operating environment.

A number of program modules may be stored on the hard disk, magnetic disk 129, optical disk 31, ROM 24 or RAM 25, including an operating system 35, one or more application programs 36, other program modules 37, and program data 38. A database system 55 may also be stored on the hard disk, magnetic disk 29, optical disk 31, ROM 24 or RAM 25. A user may enter commands and information into personal computer 20 through input devices such as a keyboard 40 and pointing device 42. Other input devices may include a microphone, joystick, game pad, satellite dish, scanner, or the like. These and other input devices are often connected to processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as a video adapter 48. In addition to the monitor, personal computers typically include other peripheral output devices such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to personal computer 20, although only a memory storage device 50 has been illustrated in FIG. 1. The logical connections depicted in FIG. 1 include local area network (LAN) 51 and a wide area network (WAN) 52. Such networking environments are commonplace in offices, enterprise-wide computer networks, intranets, and the Internet.

When using a LAN networking environment, personal computer 20 is connected to local network 51 through a network interface or adapter 53. When used in a WAN networking environment, personal computer 20 typically includes a modem 54 or other means for establishing communication over wide area network 52, such as the Internet. Modem 54, which may be internal or external, is connected to system bus 23 via serial port interface 46. In a networked environment, program modules depicted relative to personal computer 20, or portions thereof, may be stored in remote memory storage device 50. It will be appreciated that the network connections shown are exemplary and other means of establishing a communications link between the computers may be used.

Time-Bound Tuning of Physical Database Design

Figure 2:
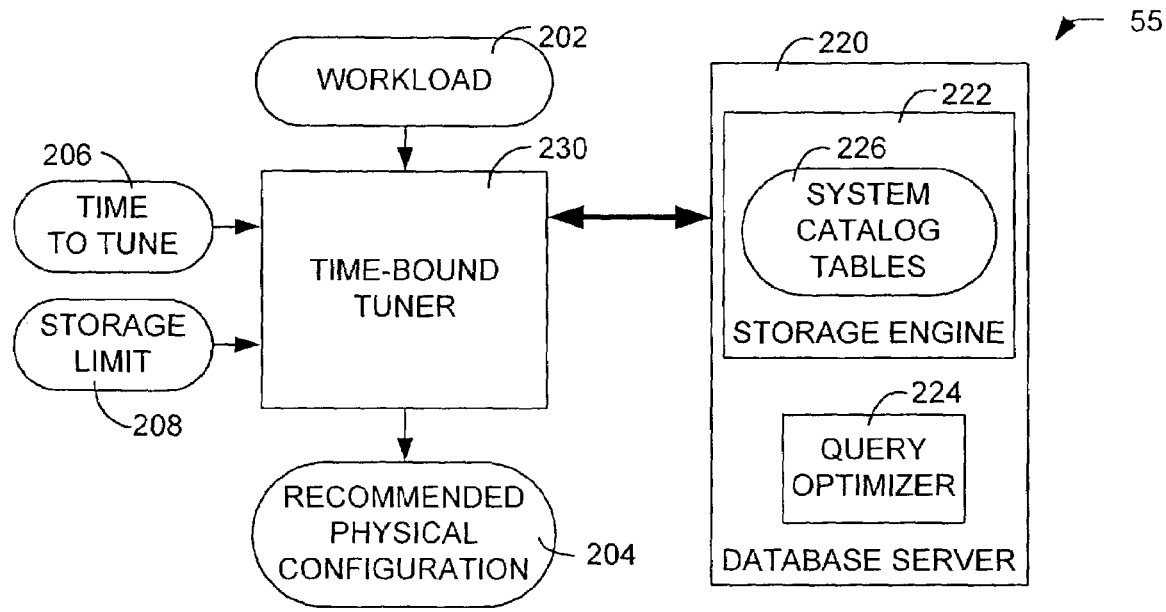
FIG. 2 is a block diagram of a database system that includes a time-bound tuner.

FIG. 2 illustrates one example of a computer database system that includes a time-bound tuner 230 for recommending a database physical configuration for query optimization. The database system 55 comprises a database (not shown), a database server 220, and a time-bound tuner 230. Database system 200 manages the storage and retrieval of data in database in accordance with data manipulation statements or queries presented to database system 200 by a database application or by a user, for example.

The database comprises a set of tables of data along with information about relations between the tables. Tables represent relations over the data. Each table comprises a set of records of data stored in one or more data fields. The records of a table are also referred to as rows, and the data fields of records in a table are also referred to as columns.

Database server 220 processes queries, for example, to retrieve, insert, delete, and/or update data in database. Database system 200 may support any suitable query language, such as Structured Query Language (SQL) for example, to define the queries that may be processed by database server 220. Suitable SQL queries include, for example, Select, Insert, Delete, and Update statements. Database server 220 for one embodiment comprises the Microsoft® SQL Server.

Database server 220 comprises a storage engine 222 for accessing data in the database. To enhance performance in processing queries, database server 220 uses indexes and materialized views and/or other structures that may reside in system catalog tables 226 to help access data in the database more efficiently. This combination of indexes, materialized views, and other physical design structures is referred to as the physical configuration of the database system. Database server 220 comprises a query optimizer 224 to generate efficient execution plans for queries with respect to a set of indexes. In generating execution plans, query optimizer 224 relies on indexes or materialized views on column(s) of table(s) or tables(s) referenced in a query to estimate, for example, the cost in time to execute the query against the database using more than one possible execution plan for the query. Query optimizer 224 may then choose among possible execution plans for the query. As the database system is acted upon by users issuing queries and updates, it becomes necessary to update the physical configuration of the database. To perform timebound tuning, a user inputs to the timebound tuner 230 both an upper limit 206 or bound on the time that may be expended during the tuning process and the amount of storage 208 that may be used to store a physical configuration. The timebound tuner outputs a recommended physical configuration 204 at the end of the time limit. The use of a timebound on tuning insures that the tuning process will be complete prior to restarting normal operation of the database.

Workload 202 may be any suitable set of one or more queries. Workload 202 may be, for example, a representative set of one or more queries to be executed against the database. Workload 202 may be an organization specific representative workload used by a database administrator or a set of one or more queries identified by logging events at database server 220. Where database server 220 comprises the Microsoft® SQL Server, for example, the database administrator can use the SQL Server Profiler to log all queries that executed on database server 220 over the past week, for example. In addition, filters can be applied on a number of properties of the events in the log to select queries in accordance with a predetermined criteria. Queries that take at least one second to execute, for example, may be logged.

The time-bound tuner 230 attempts to produce the best possible recommended physical configuration given the workload and the time and storage limits. As will be discussed in greater detail below, the tuner proceeds incrementally to improve the existing configuration by examining a next portion of the workload, and arrives at a recommended configuration for that part of the workload that has been examined. If a relatively small time limit is passed to the tuner, each incremental tuning consumes a small amount of time, meaning only the most expensive queries and structures beneficial to those queries are included, while a relatively large time limit enables more detailed analysis for each increment of tuning.

Database server 220, storage engine 222, query optimizer 224, and time-bound tuner 230 are implemented for one example as program modules or computer-executable instructions and may be stored on any suitable computer-readable medium for execution in a suitable operating environment, such as the computing environment of FIG. 1 for example. The data of database 210 and system catalog tables 226 may be implemented in the form of one or more suitable data structures and may also be stored on any suitable computer-readable medium.

Figure 3:
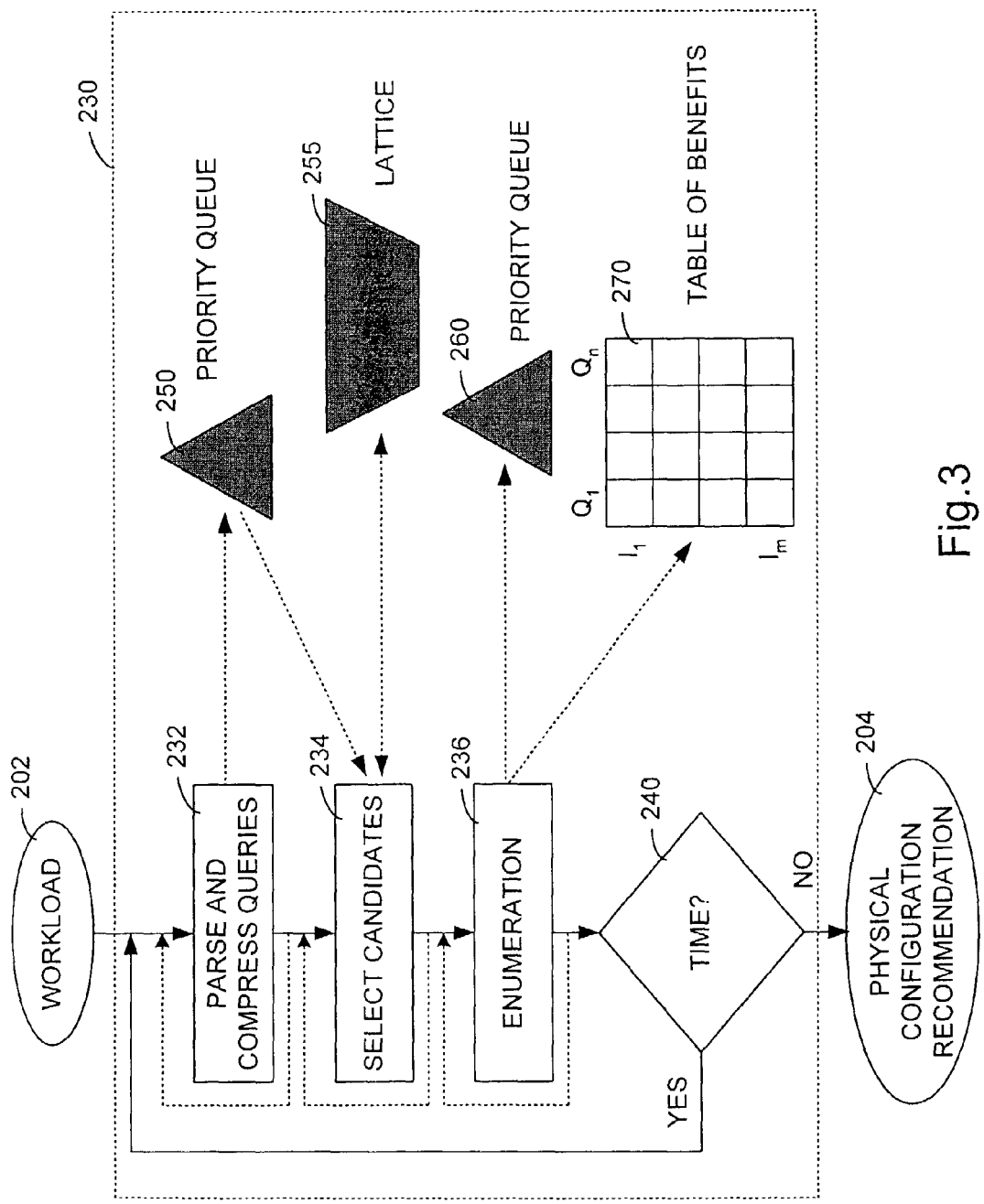
FIG. 3 is a more detailed diagram of the time-bound tuner of FIG. 2.

FIG. 3 illustrates in more detail the time-bound tuner 230 that produces a recommended physical configuration for the database given the workload and time/storage constraints. The workload 202 is the basis for the tuner's operation and a timer 240 contains an upper limit on the time allotted for tuning. The time-bound tuner 230 includes three modules, a module for parsing and compressing the queries in the given workload 232, a module for selecting candidates for each query that are useful in answering the query 234, and an enumeration module 236 that finds a subset of the candidates chosen by the select candidates module 234 that satisfy the storage constraint and gives the maximum improvement for the workload. Each of these modules is tailored to effectuate time-bound tuning.

A key issue in time-bound tuning is that the above three modules cannot be invoked in sequence on the entire workload. This is because (a) the time taken to simply parse all queries in the workload may exceed the total time-bound and (b) because one of the design goals is to ensure that the recommendation improves at a relatively small time granularity. To implement time-bound tuning, the time-bound tuner partitions the total time-bound into small time slices, or portions, and invokes the above three modules in three phases within each time slice. In each time slice an additional set of queries is parsed from the workload, candidates are found for some more queries, and a revised (and hopefully improved) configuration recommendation for the workload that has been seen thus far is found. For the purposes of this description, the queries in the workload are parsed in chronological order and the time allotted to the three phases is relatively uniform throughout the workload. However, based on additional information about the workload that may be available such as a query cost distribution, less "interesting" (less expensive) sequences of queries may be analyzed using a larger portion of the time slice devoted to parsing to reach the "interesting" portion of the workload at which point the parsing may be allotted a smaller amount of time to provide a more detailed analysis. In addition, the workload may be parsed in an order other than chronological order.

The granularity at which the recommendations improve is the granularity of a time slice. The time slice duration is determined by the total time-bound, since when a large time-bound is provided, users are typically satisfied if the improvements occur at a slightly slower granularity. Thus, for the described embodiment, the duration of a time slice is set to the square root of the total time-bound, which is a slowly growing function of the total time-bound. This duration has been found to be reasonable through experimentation. For this embodiment, a minimum and maximum limit is imposed on the duration of a time slice. The minimum limit is dictated by the fact that very small time slices incur a high overhead of repeated invocation of various steps without actually getting useful work in the steps done. A minimum time slice of one minute has been found to be effective. The maximum time slice is determined by the criteria that recommendation should improve at a fine granularity. Thus for this embodiment, the maximum time slice is fifteen minutes.

For the described embodiment, the time in a time slice is allocated as follows: twenty percent of the time is spent parsing and the remaining eighty percent of the time is divided equally between candidate selection and enumeration. This allocation was selected because parsing a query requires one call to the query optimizer and is generally much faster than the work done for the query in candidate selection, which typically requires several optimizer calls, or work done for the query in enumeration. With this allocation, it has been observed that several queries can be examined before starting candidate selection, thereby increasing the likelihood that important queries are analyzed. If the work to be done within a time slice terminates earlier than the time allotted, the next time slice is begun.

Since the goal of time-bound tuning is to find a configuration (i.e. a set of physical design structures such as indexes, materialized views, etc. . . . ) with the maximum improvement for the given workload, one of the challenges is that the tuning time be spent on queries and physical structures which, if considered, are likely to result in significant improvement for the workload. A second challenge is that since the tuning is done incrementally in time slices, efficient data structures and algorithms that work well incrementally are necessary.

Referring again to FIG. 3, a more detailed description of the operation of the various modules and data structures within the time-bound tuner 230 will be described. After queries are parsed and compressed by module 232, the compressed queries are placed into a priority queue shown schematically as 250, where the priority of a query is its estimated execution cost (as estimated by the query optimizer). The priority queue can be maintained very efficiently even when the number of queries added to it are large (logarithmic in the number of queries). The operation of finding and extracting the next most expensive query to tune is also very efficient.

Figure 4:
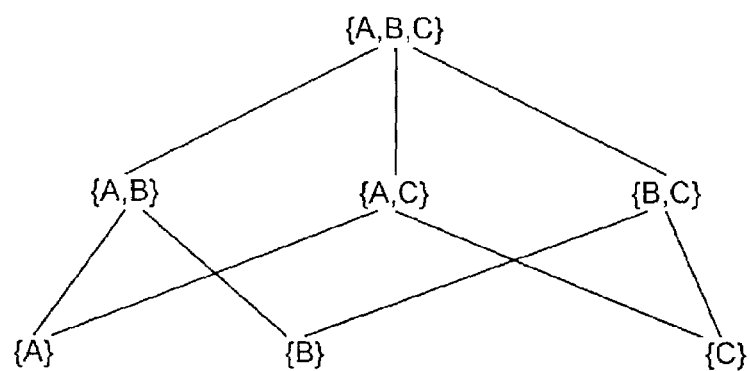
FIG. 4 is a data structure summary of frequently referenced tables/columns that is maintained in accordance with an embodiment of the present invention.

A lattice of frequently referenced sets of tables (as well as a frequently refered sets of columns for each table) is maintained in the workload as illustrated schematically as 255 (an example lattice is shown in FIG. 4). A set of tables (referred to as a table subset) is considered frequent if it is referenced in queries whose total cost exceeds a predetermined percentage of the cost of queries in the workload seen thus far. This technique allows the tuner to focus on important sets of objects (tables/columns) for the workload quickly without having to make several optimizer calls.

Known techniques for efficiently computing the lattice for a given workload can be adapted to construct the lattice in a bottom-up manner as shown in FIG. 4. However, in time-bound tuning, each time slice parses an additional set of queries that can affect the table subsets that need to be maintained in the workload. If the lattice were to be recomputed from scratch for each time slice by taking the entire workload into account (including the queries seen in the current time slice), the approach would not be scalable. Instead, a lattice is computed only for the workload in the current time slice and then the newly computed lattice is merged with the lattice that has been produced from all previous time slices combined. The merge technique is based on the following observation: if an element occurs in both lattices, its frequency exceeds the threshold in both cases and therefore it must be part of the new lattice. By a similar argument, if the element does not occur in either element it cannot be a part of the new lattice. When an element occurs in one lattice but not in the other, the frequency of that element is computed for the portion of the workload for which it was not frequent. If the combined frequency now exceed the threshold, the element becomes part of the new lattice. The updated frequencies for all such undecided elements can be computed in a single pass of the workload seen thus far.

The enumeration module 236 utilizes an LP Solver/Knapsack based algorithm that is described in more detail below. In general, the enumeration algorithm assigns a benefit to each structure (e.g. index) that is relevant to a query based on the given query and set of configurations that are relevant for that query, shown schematically as 270. This assignment is performed such that when the benefits for a given subset of the indexes are summed up, they most closely approximate the actual benefit if that subset of indexes were present. During enumeration, a set of cells is evaluated as determined by a priority queue of cells shown generally as 260. For exactly the set of queries that were evaluated above, the LP solver is incrementally invoked to readjust the benefits for structures referenced in those cells. After that, the Knapsack search algorithm (that requires no further optimizer calls) is re-run to quickly produce a new configuration whose quality is evaluated. These steps are repeated at a fine granularity within the enumeration step.

A significant portion of the time taken during enumeration is spent in making calls to the optimizer. Each call returns the estimated cost of a (Query, Configuration) pair. Thus, to use the given time-bound effectively, the optimizer calls that could result in potentially the most improvement for the workload should be made first. The achieve this, a function that estimates the importance of a cell is used to order the cells in a priority queue based on the value produced by this estimator. This function takes into account the following factors: (a) cost of the query (b) potential applicability of the structures in the configuration to the workload. The following function is used for estimating "importance" of cell (Q,C) where Q is a query and C is a configuration: Applicability(C) is the total cost of all queries for which configuration C in its entirety is applicable (i.e. all objects in C can be used by the query optimizer to answer the query). The cost of queries can be calculated in one of two ways. The cost of the queries can be calculated based on the physical configuration of the database prior to the initiation of the time-bound tuning or the cost can be calculated based on the most recent configuration that has been constructed during the present tuning. In the case where two cells have the same importance, the tie is broken by assigning a higher rank to whichever cell contains the query with higher current cost. This focuses the tuner on expensive queries while at the same time paying more attention to structures that together are widely applicable in the workload. Note that for any configuration C, Applicability(C)≧Applicability(C∪{I}) where I is any structure such as an index or indexed view. Thus, for a given query, the above function favors evaluating smaller (and hence more widely applicable) configuration earlier. It has been observed that this function is more effective for a variety of database workloads than either Cost(Q) or Cost(Q)*Applicability(C).

When a recommendation is proposed, it is typical to provide a set of quantitative analysis reports that describe the impact of accepting the recommendation (e.g. expected improvement for the workload compared to the current physical design, which indexes are used and how many times, etc.). To obtain these reports, at the end of the tuning, a pass is performed over the tuned workload in which the optimizer is invoked two times for each query: once for the current physical design and once of the recommended design. For large workloads, making this pass can be time consuming and must be incorporated into the time-bound tuning process. Therefore, a running estimate is kept of how much time is required to make two optimizer calls for the workload tuned thus far. This running estimate is based on the observed time for invoking the optimizer for each query. When this estimate is equal to the total remaining time, the actual tuning is terminated and the final pass is started to ensure that the given time limit is not exceeded by a significant amount.

Assigning Benefits to Data Structures Using LP Solver/ Knapsack Algorithm

To implement time-bound tuning as described above, an enumeration algorithm called LP Solver/Knapsack is used to assign benefit to indexes that performs well in the time-bound tuning environment. While LP Solver/Knapsack is described herein in the context of selecting indexes in a time-bound tuning, it is contemplated that the algorithm can be used in any database configuration tuning system where it is helpful to assign benefit to any type of individual candidate physical design structure based on interactions between structures.

For the purposes of this description it is assumed that for any given database table, or relation, there can be at most one clustered index. The indexes considered are built over the relations and are denoted by $i_1, \ldots, i_k, \ldots$ where k denotes the k-th index from a list of indexes defined over the relation. A set of indexes is termed as a configuration. The workload, denoted by Q, is a set of SQL statements $q_1, \ldots, q_m$, that may include select, insert, delete or update statements. Besides specifying the workload, the user may also specify a base configuration, i.e., a set of indexes (possibly empty) that must be part of the configuration that is output. Such a base configuration may include, e.g., the indexes used to enforce referential integrity such as primary key constrains. The benefit of a configuration with respect to a query (or a workload) is defined as the decrease in the estimated cost of the query (or the workload) with respect to the base configuration and includes the cost of maintaining the configuration. Note that the benefit could be negative for certain combinations of queries and configurations, typically update queries. A formal definition of the notion of benefit as defined for the purposes of this description is:

Given a set of indexes $I=i_1, i_2, \ldots, i_n$ with non negative storage $s_1, \ldots, s_n$ and a set of queries (workload) $Q=q_1, q_2, \ldots, q_m$. The benefit for a query $q_j$ is a function $F_{q_i}: 2^I \mapsto \mathcal{R}$. The set I is partitioned into disjoint sets $B_j$, $$I = \bigcup_{j=1}^{h} B_j.$$

A valid solution $S \subseteq I$ is a set of indexes that satisfies the following two conditions: at most one index is chosen from every set $B_j$ and $$\sum_{i_k \in S} s_k \leq T$$

where T is a threshold specified by the user. The aim is to choose a valid solution S that maximizes $$\sum_{q_i \in Q} F_{q_i}(S).$$

Automatic index selection algorithms seek to recommend a set of indexes that have the maximum benefit for a given workload and database. The storage space required to build the indexes should not exceed a certain user specified bound. Moreover, the recommended configuration should be valid, i.e. it should contain the base configuration and must have at most one clustered index. Because the indexes are selected based on their benefit with respect to the workload, the benefit assignment performed by the LP Solver/Knapsack is critical to obtaining good results.

The LP Solver/Knapsack algorithm is performed in a preprocessing phase that assigns benefits to indexes in a principled manner such that when the atomic benefits associated with indexes in a given configuration are added together, they approximately equal the benefit found for the configuration. This approach makes the application of a Knapsack type index selection algorithm more accurate and scalable.

Figure 5:
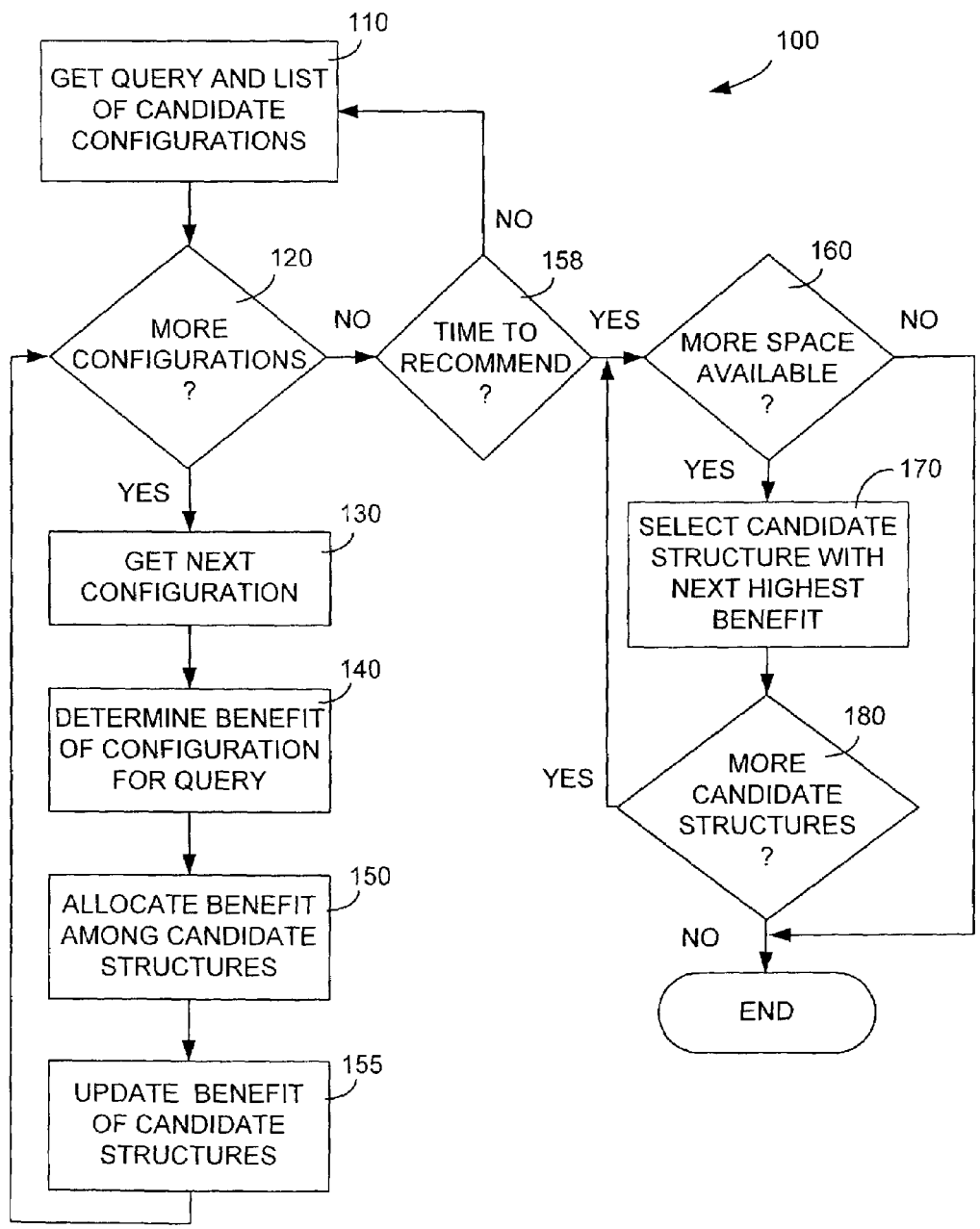
FIG. 5 is a flow chart diagram of a method for selecting an index configuration according to an embodiment of the present invention.

FIG. 5 illustrates a method 100 for assigning benefits to structures that takes into account interactions between the structures. With respect to a query in the workload, the method assigns an individual, or atomic, benefit to a given structure based on the benefits realized by any configuration that includes the given structure. To make the atomic assignment, the method solves a set of linear equations based on the benefit realized by each configuration that includes the given structure.

In step 110, a list of candidate configurations and query pairs relevant to the query being examined is presented to the algorithm. A configuration and query pair is chosen for analysis in step 130, and in step 140 the query optimizer is called to determine the benefit of the configuration for execution of the query. As discussed in conjunction with the time bound tuning technique described in an earlier section, the configurations may first be ranked based on an applicability measure and the query optimizer is then called on to determine the benefit of configurations in the order they are ranked. An actual benefit is calculated for the configuration based on the optimizer call and in step 150, the overall benefit is allocated amongst the structures that make up the configuration without assuming independence. The benefit for a group of structures is treated as the sum of benefits for the individual structures, a property that will be referred to hereinafter as "linearity". Thus, for a given query $q_j$, benefits are assigned to relevant structures of $q_j$ so that these benefits follow the same property of linearity.

Given a query q for the workload, with benefit function $F_q$. Let $I_q=\{i_1, \ldots, i_m\}$ be the set of relevant structures (for ease of notation in this portion of the description it is assumed that indexes are the only relevant structures being considered) for the query as found in step 110. Note that for any index that is not relevant for the query, a benefit of zero is assigned. If $F_q:2^{I_q} \mapsto \mathcal{R}$ is restricted to $I_q$, it is desirable to assign benefits $B=\{b_1, \ldots, b_m\}$ to indexes in $I_q$ such that they follow linearity, i.e. $\forall S \subseteq I_q: \phi(S).B=F_q(S)$, where $\phi(S)$ is the characteristic vector (defined as a $\{0,1\}$ vector with 1 in position j if $i_j \in S$ and 0 otherwise) for subset S. However the benefit function $F_q$ could be arbitrary and it may not be possible to get such an assignment (B). Therefore, the algorithm searches for an assignment B that has the best possible approximation for the linearity property. An assignment B is called a K-tolerant benefits vector for the query q if it satisfies the following Equation 1:

$$\forall S \subseteq I_q : \frac{1}{K} F_q(S) \leq \phi(S) \cdot B \leq K F_q(S)$$

For every query, it would be ideal to obtain the K-tolerant benefits vector for the smallest possible K. For a fixed value of K, it is possible to obtain a K-tolerant benefits vector (if there exists one) by solving a linear program with the inequalities as in the above Equation 1 for every subset S of $I_q$. The algorithm starts with K=1 and incrementally increases the value of K by a factor, such as 1.1, until a value of K is found that resolves the inequalities. Thus a range of values for K (between the value found in the preceding step and its predecessor value) is established between which a feasible solution exists. Binary search techniques are then used to find the smallest value of K in this range for which a feasible solution exists. The following example illustrates how benefits are assigned.

EXAMPLE 1

Given a query q SELECT*FROM Employees WHERE Age≦30 AND Salary≧75K. Let $I_A$ and $I_S$ denote indexes on columns Age and Salary respectively, and $b_A$ and $b_S$ respectively denote benefit to be assigned to each index for this query. Assume that the benefits obtained for q with configurations $\{I_A\},\{I_S\},\{I_A,I_S\}$ are 20, 10, and 25 units respectively. Then, the assignment $b_A=16.66$ and $b_S=8.33$ is a K-tolerant solution, where the smallest K=1.2. Note that using the DB2 approach discussed in the background section, both $b_A$ and $b_S$ would have been assigned the same value, 25.

For every set of relevant indexes $I_q$ for a query may still be large so that computing the value of $F_q(S)$ for every $S \in 2^{I_q}$ may be expensive since every such value requires a call to the query optimizer. Thus, in practice, the sets S for which the values $F_q(S)$ are computed (and hence the inequalities solved in the linear program) must be pruned. One such pruning strategy looks at the singleton sets and pairs of indexes. This pruning is based on the intuition that the pairs will capture most of the important interactions between indexes. Other pruning strategies may be used as well.

For every query $q_j$ a tolerance factor $K_j$ is obtained. The weighted value of $K_j$'s (weighted by the cost of query) gives an idea about the goodness of the solution. Higher values of $K_j$'s suggest that the benefit functions ($F_{q_j}$'s) are such that they cannot be approximated well by a linear function. It bears noting that if the elements of $2^{I_q}$ are not pruned and instead a true K-tolerant benefits vector is obtained for every query, then the solution presented by the algorithm has an approximation guarantee of $2K^2_{MAX}$. The following is a pseudocode representation of the algorithm just outlined. While this pseudocode represents a method of assigning benefit amongst indexes to maintain consistency with the preceding description, one of skill in the art will appreciate that it may also be applicable to any structure, such as materialized views.

```
Input:   A query 1, set of relevant indexes I_q,
Output:  A benefit b_k for every index i_k in I_q, tolerance factor K
   1.   For every singleton subset S = {i_j} and pair S =
        {i_j, i_k} obtain the benefit Fq(S) using the query
        optimizer.
   2.   Set K = 1.
   3.   do
            set inequalities as in Equation 1.
            solve the system of inequations to find if
            there exists a feasible solution.
            if there exists a feasible solution assign b_k
            (the vector B) as benefit of index i_k.
        Else set K = 2K
```

This approach makes calls to the optimizer only in the first phase, i.e., during the benefits assignment phase. No optimizer calls are made in the second (greedy knapsack search) phase. Moreover, the size of the system of inequations to be solved is generally small (10's or 100's) so that obtaining a solution is very fast. In addition, this algorithm can give instance specific guarantees about the performance.

Once each structure has been assigned an atomic benefit in step 150, the enumeration algorithm 100 (FIG. 5) adds the benefits assigned in the prior step to a table of benefits that is kept over all queries from the workload that have been examined (step 155). Thus a sum of the benefits determined for a given structure over all queries is available when structures are selected for enumeration. Once all configurations have been analyzed for benefit for the present query, the algorithm gets another query and list of candidate configurations (step 110) until the time allotted for enumeration in the present time slice has expired (see decision step 158). At that time, the algorithm moves to the steps of compiling the list of recommended structures. As long as more space is available for storing structures, the structure with the highest benefit is added to the recommendation list until space or structures are exhausted (steps 160–180).

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

We claim:

1. A method for tuning a database to recommend a set of physical design structures for the database that optimize database performance for a given workload, wherein the workload comprises queries that have been executed on the database, and wherein a total time bound that defines a maximum amount of time that can be spent tuning is given, the method comprising the steps of:

maintaining a cumulative set of recommended structures; and updating the cumulative set of recommended structures by tuning the database by examining a predetermined portion of the workload during a time slice that is a fraction of the total time bound such that at the end of the time slice, a set of recommended structures has been enumerated that is based on the workload portions that have been examined; and repeating the updating step until all queries in the workload have been examined unless the time bound is reached.

2. The method of claim 1 wherein the time slice has a duration approximately equal to the square root of the total time bound given for tuning.

3. The method of claim 1 wherein the updating step is performed by:

parsing queries in the workload for a first portion of the time slice;

selecting candidate structures that are relevant to queries that have been parsed for a second portion of the time slice; and enumerating the set of structures during a third time portion of the time slice.

4. The method of claim 3 wherein the parsing step is performed by ranking queries in order of cost in a priority queue.

5. The method of claim 3 wherein the selecting step is performed by discarding any structures that are not in a lattice of frequently accessed objects.

6. The method of claim 3 wherein the enumerating step is performed by ranking sets of candidate structures based on an applicability measure, determining a benefit for sets of candidate structures in order of applicability, maintaining a cumulative benefit for each candidate structure based on the tuning performed thus far, and selecting structures having the highest cumulative benefit for enumeration.

7. A method for tuning a database by recommending a set of physical design structures for the database that optimize database performance for a given workload, wherein the workload comprises queries that have been executed on the database, the method comprising the steps of:

(a) determining a time interval during which at least a portion of the workload is to be examined to produce a recommended configuration;

(b) dividing the time interval into first, second, and third time portions;

(C) examining queries in the workload for the first time portion to determine structures that apply to the examined queries;

(d) terminating the examining queries step no later than the expiration of the first time portion;

(e) selecting candidate structures that relate to examined queries in the second time portion;

(f) terminating the selecting candidate structures step no later than the expiration of the second time portion;

(g) enumerating the set of recommended structures during the third time portion; and (h) terminating the enumerating step no later than the expiration of the third time; and (i) establishing a tuning time-bound that is the maximum amount of time that can be spent tuning the database and wherein the time interval is a fraction of the tuning time-bound and wherein steps (b)–(h) are repeated for a plurality of time intervals.

8. The method of claim 7 wherein the time interval is determined to be approximately the square root of the tuning time-bound.

9. The method of claim 7 comprising the step of compressing the workload to remove redundant or similar queries prior to examining the queries.

10. The method of claim 7 wherein the examined queries are ordered according to a predetermined criteria for the selecting candidate step.

11. The method of claim 10 wherein the examined queries are placed in a priority queue having a priority based on the estimated cost to execute the query.

12. The method of claim 11 wherein the step of selecting candidate structures is performed by examining a query at the top of the priority queue.

13. The method of claim 7 wherein the step of selecting candidate structures is performed by discarding any structure that is not related to a frequently referenced object.

14. The method of claim 13 comprising the step of maintaining a lattice of frequently referenced objects wherein a frequently referenced object is referenced in queries whose total cost exceeds a predetermined threshold and the discarding step is performed by referring to the lattice.

15. The method of claim 14 wherein the maintaining step is performing by constructing a lattice for the portion of the workload examined in step (a).

16. The method of claim 7 wherein a present interim lattice is constructed for each time interval and the interim lattice is merged with a prior overall lattice constructed during a prior time interval to form an present overall lattice.

17. The method of claim 16 wherein the lattices are merged by comparing elements in the present interim lattice to the elements in the prior overall lattice and including elements that are found in both lattices in the present overall lattice.

18. The method of claim 16 wherein the lattices are merged by comparing elements in the present interim lattice to the elements in the prior overall lattice and omitting elements that are not found in the present interim lattice from the present overall lattice.

19. The method of claim 16 wherein the lattices are merged by comparing elements in the present lattice to the elements in the prior overall lattice and for undecided elements that are found in one lattice but not the other, recomputing a frequency for the element over the portion of the workload corresponding to the lattice in which the element was absent and including the element in the present overall lattice if the recomputed frequency is above a predetermined threshold.

20. The method of claim 19 wherein the undecided elements are collected during the candidate selecting step and are evaluated in a single pass of the workload portion.

21. The method of claim 7 wherein the step of enumerating the set of recommended structures is performed by:

determining a total benefit provided by a candidate set of structures given a query that has been examined during a prior examining step;

allocating the benefit amongst the structures belonging to the candidate set such that the sum of the allocated benefits is approximately equal to the total benefit determined for the candidate set for the query;

adjusting a cumulative benefit for a given structure by determining a total benefit for further candidate sets given further queries examined during the examining step, allocating the total benefit amongst the structures belonging to the set, and adding the benefit allocated to the given structure across examined queries to arrive a cumulative benefit.

22. The method of claim 21 comprising the step of ranking sets of candidate structures based on an applicability measure.

23. The method of claim 22 wherein the enumerating step is performed by determining the benefit of sets of candidate structures in the order of their rank.

24. The method of claim 23 wherein if two candidate structures have an equivalent applicability measure, the structure whose applicability measure has been determined with respect to a more expensive query is selected for enumeration.

25. The method of claim 7 wherein the first time portion is approximately twenty percent of the time interval.

26. The method of claim 7 wherein the second and third time portions have an approximately equal duration.

27. The method of claim 7 comprising the step of maintaining a running estimate of a final pass time that is equal to the time required to make two optimizer calls on the portion of the workload examined thus far and wherein the enumerating step is terminated prior to the end of the tuning timebound by a time period at least as long as the final pass time.

28. The method of claim 7 wherein the step of dividing the time interval is performed based on a cost analysis of the queries in the workload that are being examined.

29. The method of claim 7 wherein the examining step is performed on queries taken in chronological order from the workload.

30. The method of claim 7 wherein the examining step is performed on queries taken in order of cost from the workload.

31. A computer-readable medium comprising computer executable instructions for performing a method for tuning a database to recommend a set of physical design structures for the database that optimize database performance for a given workload, wherein the workload comprises queries that have been executed on the database, and wherein a total time bound that defines a maximum amount of time that can be spent tuning is given, the method comprising the steps of:

maintaining a cumulative set of recommended structures; and updating the cumulative set of recommended structures by tuning the database by examining a predetermined portion of the workload during a time slice that is a fraction of the total time bound such that at the end of the time slice, a set of recommended structures has been enumerated that is based on the workload portions that have been examined; and repeating the updating step until all queries in the workload have been examined unless the time bound is reached.

32. The computer readable medium of claim 31 wherein the time slice has a duration approximately equal to the square root of the total time bound given for tuning.

33. The computer readable medium of claim 31 wherein the updating step is performed by:

parsing queries in the workload for a first portion of the time slice;

selecting candidate structures that are relevant to queries that have been parsed for a second portion of the time slice; and enumerating the set of structures during a third time portion of the time slice.

34. The computer readable medium of claim 33 wherein the parsing step is performed by ranking queries in order of cost in a priority queue.

35. The computer readable medium of claim 33 wherein the selecting step is performed by discarding any structures that are not in a lattice of frequently accessed objects.

36. The computer readable medium of claim 33 wherein the enumerating step is performed by ranking sets of candidate structures based on an applicability measure, determining a benefit for sets of candidate structures in order of applicability, maintaining a cumulative benefit for each candidate structure based on the tuning performed thus far, and selecting structures having the highest cumulative benefit for enumeration.

37. An apparatus for tuning a database to recommend a set of physical design structures for the database that optimize database performance for a given workload, wherein the workload comprises queries that have been executed on the database, and wherein a total time bound that defines a maximum amount of time that can be spent tuning is given, comprising:

a structure accumulator for maintaining a cumulative set of recommended structures; and an update tool for updating the cumulative set of recommended structures by tuning the database by examining a predetermined portion of the workload during a time slice that is a fraction of the total time bound such that at the end of the time slice, a set of recommended structures has been enumerated that is based on the workload portions that have been examined; and wherein the update tool repeatedly updates the set until all queries in the workload have been examined unless the time bound is reached.

38. The apparatus of claim 37 wherein the update tool updates the set by:

parsing queries in the workload for a first portion of the time slice;

selecting candidate structures that are relevant to queries that have been parsed for a second portion of the time slice; and enumerating the set of structures during a third time portion of the time slice.

39. The apparatus of claim 38 wherein the update tool enumerates the set by ranking sets of candidate structures based on an applicability measure, determining a benefit for sets of candidate structures in order of applicability, maintaining a cumulative benefit for each candidate structure based on the tuning performed thus far, and selecting structures having the highest cumulative benefit for enumeration.

40. An apparatus for tuning a database to recommend a set of physical design structures for the database that optimize database performance for a given workload, wherein the workload comprises queries that have been executed on the database, and wherein a total time bound that defines a maximum amount of time that can be spent tuning is given, comprising:

means for maintaining a cumulative set of recommended structures; and means for updating the cumulative set of recommended structures by tuning the database by examining a predetermined portion of the workload during a time slice that is a fraction of the total time bound such that at the end of the time slice, a set of recommended structures has been enumerated that is based on the workload portions that have been examined; and wherein the means for updating repeatedly updates the set until all queries in the workload have been examined unless the time bound is reached.

41. The apparatus of claim 40 wherein the means for updating updates the set by:

parsing queries in the workload for a first portion of the time slice;

selecting candidate structures that are relevant to queries that have been parsed for a second portion of the time slice; and enumerating the set of structures during a third time portion of the time slice.

42. The apparatus of claim 41 wherein the means for updating enumerates the set by ranking sets of candidate structures based on an applicability measure, determining a benefit for sets of candidate structures in order of applicability, maintaining a cumulative benefit for each candidate structure based on the tuning performed thus far, and selecting structures having the highest cumulative benefit for enumeration.

\* \* \* \* \*